N. FRANZEN.
METHOD OF MAKING WIRE GLASS.
APPLICATION FILED OCT. 23, 1913.
Patented Apr. 13, 1915.
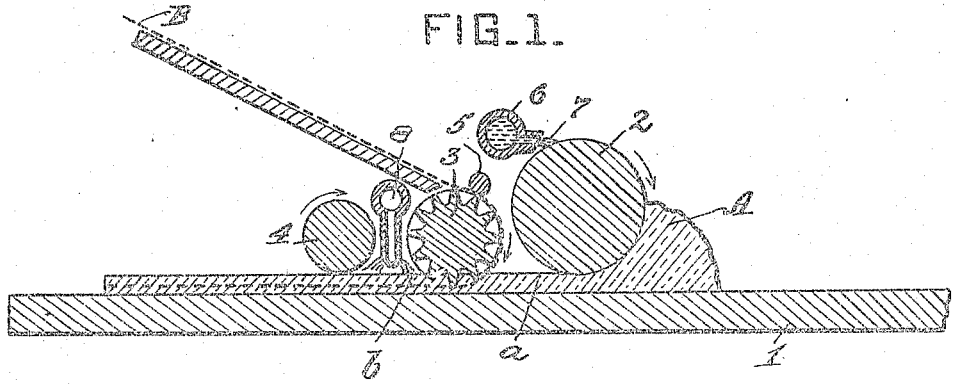
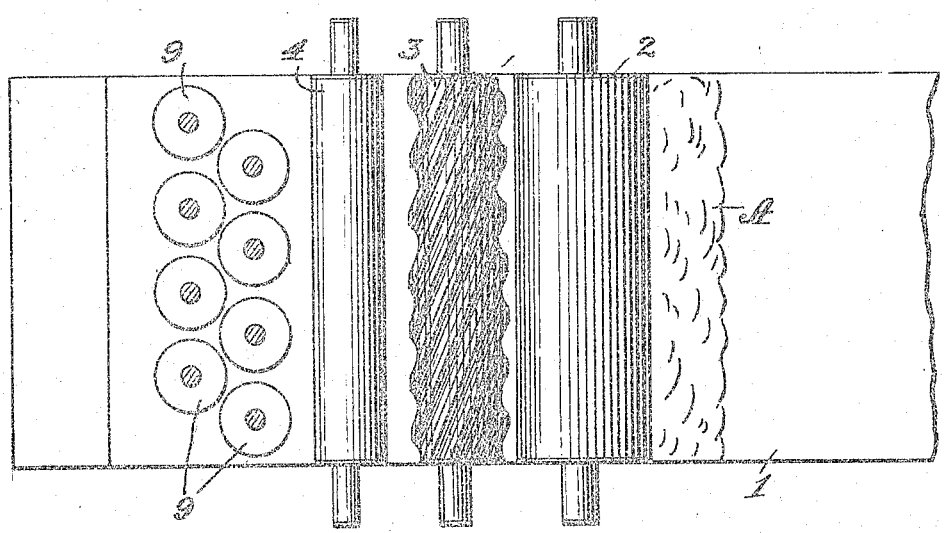
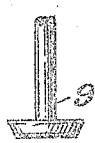
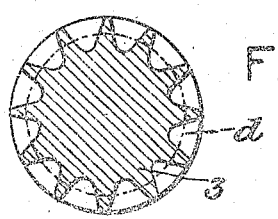

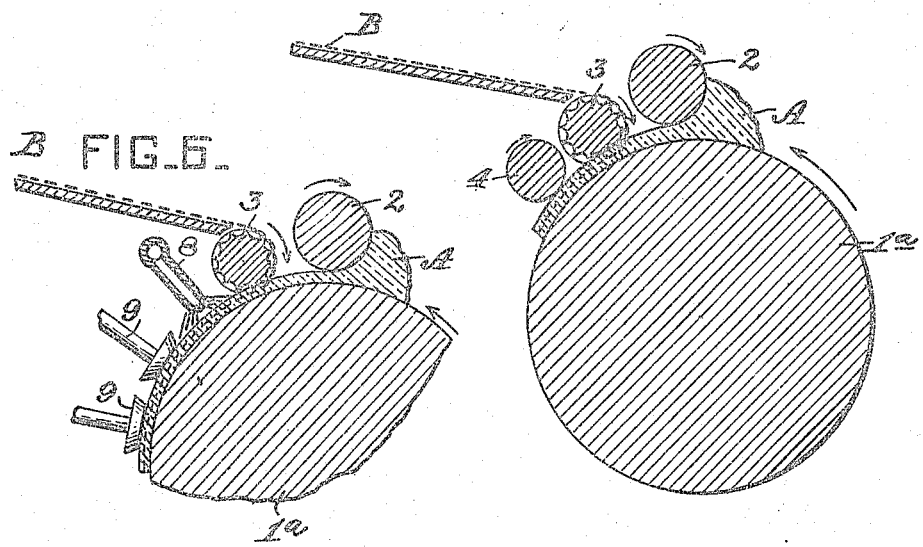
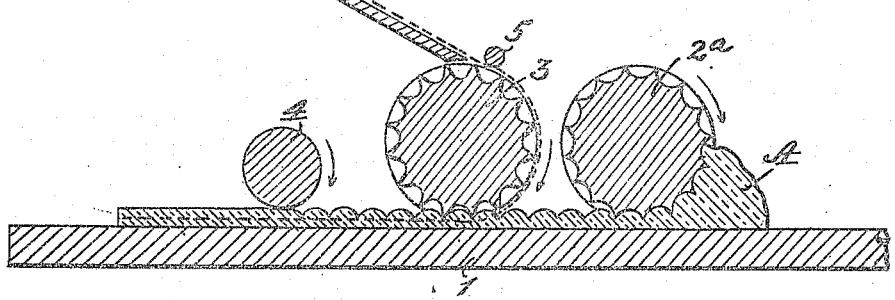

UNITED STATES PATENT OFFICE.

NICKLAS FRANZEN, OF WALTON, PENNSYLVANIA, ASSIGNOR OF ONE-HALF TO PITTSBURGH PLATE GLASS COMPANY, OF PITTSBURGH, PENNSYLVANIA, A CORPORATION OF PENNSYLVANIA.

METHOD OF MAKING WIRE-GLASS.

1,135,371.      Specification of Letters Patent.      Patented Apr. 13, 1915.

Application filed October 23, 1913. Serial No. 796,937.

*To all whom it may concern:*

Be it known that I, NICKLAS FRANZEN, residing at Walton, in the county of Allegheny and State of Pennsylvania, a citizen of the United States, have invented or discovered certain new and useful Improvements in Methods of Making Wire-Glass, of which improvements the following is a specification.

My invention has to do with improvements in making wire glass by what is called the one-pour operation, that is, the operation in which a single batch of molten glass is spread against a supporting surface to sheet form with wire incorporated within it; and the objects of my improvements are to render this one-pour operation of greater practical value than it has heretofore been, by avoiding certain difficulties in the prior practice.

The machine herein disclosed by which I carry out the process claimed in this application is claimed in a prior application filed by me May 8th, 1909, Serial No. 494,858.

In the accompanying drawings which form part of this specification, Figure 1 is a view in longitudinal vertical section of my improved machine, performing in its operation my improved method; Fig. 2 is a plan view of this machine, showing one feature or element thereof in modified form; Fig. 3 shows in elevation a detail of the machine as illustrated in Fig. 2; Fig. 4 is a view in cross section of one of the rolls of the machine of Figs. 1 and 2; Fig. 5 is a view corresponding to Fig. 1 and illustrating a modification of another feature or element thereof; Fig. 6 shows in detail the application of the modification separately illustrated in Fig. 3 to the machine in the form shown in Fig. 5; and Fig. 7 shows in longitudinal vertical section a modification of still another feature or element of the machine of Fig. 1.

Parts which are repeated in the several figures bear the same reference numerals in each case.

Referring first to Fig. 1 of the drawings, the machine will be seen to include a forming surface, here shown as a horizontally extending table top 1. Means are shown, coöperating with this table-top, to spread a batch of molten glass deposited thereon to sheet form, and to incorporate therein a web of wire. The means preferably employed consist of two rolls 2 and 3, organized with the table to traverse the table from end to end. To this end the rolls are preferably mounted in stationary housings while the table is mounted to move to and fro beneath them. The rolls are preferably positively driven as the table moves. The leading roll coöperates with the table top, when the machine is in operation, to spread a batch of molten glass A, teemed upon table top 1, to sheet form, as indicated at $a$. Traveling immediately behind roll 2 is roll 3. It is a corrugated roll, and its purpose is, by virtue of its corrugations, to sink into the body of the layer $a$ the web of wire B with which its surface is covered at the time when the layer of glass $a$ in the operation of the machine comes beneath it.

In addition to the means thus far described, for spreading the sheet and sinking the wire into it, the machine includes means for smoothing the surface of the wire-containing sheet, $b$, which passes from beneath the corrugated roll, 3, and these surface-smoothing means are effective also to prevent the blackening of the wire through oxidation—a condition which, when produced, renders the product unfit for polishing, degrades its quality, and reduces its value. The means shown in Fig. 1 for accomplishing these ends consist of a gas-burner 8 arranged immediately rearward of roll 3 and of roll 4, arranged rearward of said gas-burner and properly related in its position to the table-top 1. Roll 4 also is, preferably, a positively driven roll.

The feature of the machine which I shall first describe in detail relates to the corrugated roll 3, employed for sinking the wire into the glass until it takes definite and predetermined position relative to the table top upon which the sheet is formed. I have found it advantageous to corrugate roll 3 in the manner which is indicated in Figs. 2 and 4. It will there be seen that the corrugations of the roll, instead of extending in annular grooves around the roll body, wind spirally over it, extending longitudinally of the roll as well as laterally. And further, the corrugations are cut out so deep that, in the operation of the machine, the glass entering the corrugations does not completely fill them, and the surface of the protrusions of glass entering the corrugations is not entirely chilled by contact with the roll surface. This is shown in Fig. 1, and in Fig. 4, a dotted circle, d, is intended to indicate the depth to which the corrugations of the roll enter the sheet of soft glass. The roll thus spirally corrugated is advantageous over a roll corrugated in rings around its barrel and in a plane perpendicular to its axis, because with a roll so corrugated, the wire which is carried into the glass by the corrugations will slacken between the points where the corrugations bear upon it, and when embedded in the glass will not lie so nearly in a single plane as it will if my spirally corrugated roll be used. My spirally corrugated roll is further advantageous over a roll which is corrugated longitudinally in lines parallel with the axis of the roll, because after such a roll has sunk the wire to position, the furrows or grooves formed by the projections upon the roll body are to be closed by a following smooth roll, or like means, and this smooth roll advancing over the surface and tending to close up the furrows simultaneously from end to end is the more apt to entrap in the furrows bodies of air marring the finished sheet, whereas if the corrugating roll is one which is spirally corrugated, the smooth roller advancing to iron out the furrows, does not advance upon them from end to end simultaneously but closes them gradually, beginning at one end and continuing gradually to the other end, and in such a gradual closure air is not entrapped as in the other case. Further, in order to effect the more accurate and more satisfactory placement of the wire within the glass, the wire as it is fed to the glass over the surface of roll 3 is held under tension. To this end, a small roll, 5, coöperates with the corrugated roll 3 to engage the web of wire B, descending over it, holding it against free descent, and drawing the wire taut between the bite of roll 5 against roll 3 and the point where the wire is entrained in the hot glass.

Another feature of the machine concerns roll 2 and the condition of the sheet of glass as originally spread beneath it. In order that the surface of this sheet a may not be unduly chilled, but may be as hot and soft as possible for the further operation, I preferably make provision that the surface of the leading roll 2 shall, when coming in contact with the batch of molten glass A, be moist. In consequence of this moistening of leading roll 2, the layer a as it is first spread is not so greatly chilled as it otherwise would be. In order to effect such moistening of the surface of roll 2, I provide a receptacle 6 adjacent to roll 2 for water or other fluid, and allow it to feed out through a suitably disposed opening, and preferably soak through a brush or wick 7 which makes contact with or brushes over the surface of roll 2 as the roll turns. The moistening substance need not be water, but may be any substance which by vaporizing will tend to form a heat-insulating envelop over the roll surface when it comes in contact with the batch of glass A.

Another feature of my machine concerns the further treatment of the wire-containing sheet b, after it has passed from beneath the corrugated roll 3. In preëxisting one-pour operations, two difficulties have been encountered: one difficulty has been that, in consequence of the chilling of the glass by the corrugated roll used for sinking the wire into the sheet, it has not been possible to entirely eradicate the furrows and produce a perfectly smooth surface; and the other difficulty has been that the wire, heated to or near incandescence by contact with the glass, is, when the uncompleted sheet passes from beneath the corrugated roll, exposed, at the bottoms of the furrows, to the oxidizing effect of the air. I have already explained that, by the peculiar construction of my wire-sinking roll 3, the ridges of glass which are formed beneath it are less completely chilled than is the case with a corrugated roll of usual construction, and in consequence, the furrowed surface may be leveled more smoothly and the glass since it is still soft has a tendency to spread and cover the wire more completely, as the sheet passes from beneath the wire-sinking roll. However, I preferably employ additional means for overcoming the difficulties mentioned above; I interpose between the wire-sinking roll 3 and the smoothing roll 4 means for reheating and softening to a greater degree the uneven surface of layer b. This reheating means preferably consists of a gas-burner 8 with nozzle or nozzles so positioned as to cause a sheet of flame to play upon the surface of the layer b as it passes from beneath roll 3 to roll 4 or to such other smoothing means as I may employ. It will be understood that, not only will the reheating so effected produce a better surface in the finished article, but also, by proper control, the flame may be a non-oxidizing (or even a reducing) flame, and as such may protect the wire (so far as it is exposed) from the oxidizing influence of the air, until the time when (either by the melting of the ridges of glass or by the spreading of them beneath the smoothing means) the wire is completely embedded. It will be understood that the part 8, instead of being a gas-burner, may emit a non-oxidizing gas not hot enough to soften the glass. Such a gas will protect the wire from blackening, but will lack the advantage of softening the glass preparatory to the final smoothing.

I shall now describe certain structural alternatives or modifications of the machine shown in Fig. 1, and above described.

Figs. 2 and 3 illustrate alternative means for smoothing the uneven surface of the sheet $b$ emerging from beneath the wire-embedding means, the corrugated roll 3. These alternative means consist of a series of rotating disks, 9, so arranged that as the sheet passes beneath them, every portion of its upper surface shall be subjected to the action of these disks. I preferably arrange these disks to rest by their own weight upon the glass, and free to rise and fall in response to any irregularity of surface. In Fig. 2 I have shown both the smoothing roll 4 and the disks 9, employed in the same machine and arranged to operate successively upon the surface of the sheet. Fig. 1 shows the roll alone in use, and it will be understood that in like manner the roll may be eliminated from the machine shown in Fig. 2, and the disks alone employed. It will be understood too that whatever be the particular form of smoothing means, the means for regenerating the surface of the glass, already described, may be combined therewith, as illustrated in Fig. 1.

Figs. 5 and 6 illustrate an obvious modification of the machine of Fig. 1, the modification being the conversion of the table machine of Fig. 1 into a roll machine. A roll $1^a$ here takes the place of the table 1; and the roll $1^a$ and the rolls 2, 3, and 4 are arranged to rotate in unison and effect the operations already described. Such organization is well known to this art. In Fig. 6 the alternative smoothing means, consisting in rotating disks, are shown, applied to the roll machine and without the coöperation of roll 4, shown in Fig. 2. The disks are peculiarly applicable to the roll machine, because in consequence of the tangential position of the disk surfaces against the glass, the smoothing effect is gradually intensified as the glass moves beneath the disk.

In Fig. 7 I have shown a modification in the form of the glass-spreading roll. Instead of the smooth-faced roll, 2, of Fig. 1, I here show means for spreading the glass, such means being provided with an uneven surface, adapted to spread a sheet of glass with protrusions upon its otherwise level exposed surface. In such case the means employed for sinking the wire in the newly formed sheet, already described in preferred form as the corrugated roll 3, has a corresponding unevenness of surface. The preferred form for the glass-spreading means is the corrugated roll $2^a$, the grooves in it corresponding in position, width and direction with those of roll 3, but they are shallower than the grooves of roll 3. The particular form of corrugation may be, though it need not necessarily be that described above for the roll 3 of Fig. 1. In this case instead of arranging roll 3 at somewhat less distance from the table top than the leading roll, the space intervals between the table top and the two rolls will be substantially equal. The two rolls $2^a$ and 3, are so geared that the protrusions formed by roll $2^a$ in spreading the sheet shall in the progress of the operation register with and enter the grooves of roll 3, but, being formed in shallower grooves, and the two rolls being in this case spaced at substantially equal distances above the table top, these protrusions while entering will not fill the grooves of roll 3. The surface of the sheet is not in this case materially disturbed by roll 3, except in causing the wire to cut through the protrusions and come to position within the sheet in a plane corresponding approximately with the low points of the surface of the glass, between the protrusions. Accordingly, the chilling effect of a second roll contacting with the surface of the glass is in this case to a greater degree avoided. Moistening means, such as already described, may be used on the corrugated roll $2^a$, if desired.

The operation of the machine will be apparent to those who are familiar with wire-glass machinery upon inspection of the drawings. In the operation of the machine my improvements in method are effected. The batch of molten glass A teemed upon the table 1 is spread to layer form beneath the roll 2, the moistening of the roll effecting a superior condition of the surface of the layer spread beneath it. This layer so spread then comes beneath the corrugated wire-embedding roll, and this wire-embedding roll by virtue of the depth and shape of the corrugations and the coöperating tension roll, place the wire more definitely in the sheet and leave the surface in more suitable condition for further smoothing than is commonly the practice. The wire-containing sheet then passes from beneath roll 3 and is subjected to the heat of the burner 8, or its equivalent. The surface is thus regenerated or softened, so that the smoothing means then acting upon it will bring it to better condition than has heretofore been obtained in such wire glass machines; and, at the same time, so much of the wire as is exposed is protected from the oxidizing effect of the air.

I claim as my invention:

1. The method of making wire-glass herein described which consists in forming a single batch of molten glass into a layer with wire incompletely buried beneath one uneven surface, maintaining a non-oxidizing atmosphere over that surface in which the wire is incompletely buried, and spreading the unevenness of surface to bury the wire completely.

2. The method of making wire-glass herein described which consists in spreading a batch of molten glass to layer form, sinking wire into one surface of the layer so spread, maintaining a non-oxidizing atmosphere over that surface into which the wire has been sunk, and smoothing the said surface.

In testimony whereof I have hereunto set my hand.

NICKLAS FRANZEN.

Witnesses:
A. G. BOAL,
J. M. SHOAF.